United States Patent
Jayasankaran et al.

(10) Patent No.: US 10,151,256 B2
(45) Date of Patent: Dec. 11, 2018

(54) SYSTEMS AND METHODS TO CONTROL COLD TRANSIENT RESPONSE VIA AIR ASSIST

(71) Applicant: Caterpillar Inc., Peoria, IL (US)

(72) Inventors: Karthik Jayasankaran, Dunlap, IL (US); Arvind Sivasubramanian, Peoria, IL (US); Lingqian Yuan, Troy, MI (US); James J. Cress, West Lafayette, IN (US); David J. Lin, Peoria, IL (US); Joshua T. Annin, Lafayette, IN (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/829,361

(22) Filed: Dec. 1, 2017

(65) Prior Publication Data

US 2018/0171900 A1    Jun. 21, 2018

Related U.S. Application Data

(60) Provisional application No. 62/434,775, filed on Dec. 15, 2016.

(51) Int. Cl.
*F02D 41/00* (2006.01)
*F02B 37/10* (2006.01)
(Continued)

(52) U.S. Cl.
CPC .......... *F02D 41/0007* (2013.01); *F02B 37/10* (2013.01); *F02M 35/10157* (2013.01);
(Continued)

(58) Field of Classification Search
CPC ................ F02D 41/00; F02D 41/0007; F02M 35/10157; F02M 35/10386; F02B 37/10; F04B 2203/1103; F16H 2059/385
(Continued)

(56) References Cited

U.S. PATENT DOCUMENTS 7,975,666 B2    7/2011    Gokhale et al.
8,387,382 B1    3/2013    Dunn
(Continued)

FOREIGN PATENT DOCUMENTS

EP    1233162 A1    8/2001
JP    3464896 B2    11/2003
(Continued)

*Primary Examiner* — John Kwon
*Assistant Examiner* — Johnny H Hoang
(74) *Attorney, Agent, or Firm* — Oblon, McClelland, Maier & Neustadt

(57) ABSTRACT

A control system and method to control cold transient response of an engine. The control system can provide compressed air from a compressed air source to a turbocharger to boost speed of a turbine of the turbocharger, based on determined desired operating characteristics associated with upstream or downstream operation of the engine relative to the turbocharger. The control system can receive data corresponding to actual operating characteristics associated with the upstream or downstream operation of the engine relative to the turbocharger, compare the desired operating characteristics with the data corresponding to actual operating characteristics, and control the air assist from the compressed air source based on the comparison.

20 Claims, 7 Drawing Sheets

(51) Int. Cl.
*F02M 35/10* (2006.01)
*F02M 35/104* (2006.01)
*F02D 41/26* (2006.01)

(52) U.S. Cl.
CPC ....... *F02M 35/10386* (2013.01); *F02D 41/26* (2013.01); *F02M 35/104* (2013.01)

(58) Field of Classification Search
USPC .............. 701/101–105, 114, 115; 123/559.1, 123/559.2; 60/600, 602, 605.1, 605.2
See application file for complete search history.

(56) References Cited

U.S. PATENT DOCUMENTS

| | | | |
|---|---|---|---|
| 8,515,647 B2* | 8/2013 | Panciroli | F02D 41/0007 60/602 |
| 8,652,007 B2 | 2/2014 | Kato et al. | |
| 8,997,484 B2 | 4/2015 | Rollinger et al. | |
| 9,322,322 B2 | 4/2016 | Almkvist et al. | |
| 2003/0084886 A1* | 5/2003 | Akao | F02D 41/22 123/559.1 |
| 2009/0007563 A1* | 1/2009 | Cooper | F02B 33/32 60/600 |
| 2010/0180591 A1* | 7/2010 | Cornwell | F01N 3/021 60/602 |
| 2010/0250101 A1* | 9/2010 | Kawabe | F02D 41/0007 701/104 |
| 2011/0094238 A1* | 4/2011 | Mosley | F02C 9/28 60/773 |
| 2015/0083096 A1 | 3/2015 | Zagone et al. | |
| 2015/0136093 A1 | 5/2015 | Moore | |
| 2016/0160781 A1* | 6/2016 | Nagar | F02B 33/34 701/102 |

FOREIGN PATENT DOCUMENTS

| | | |
|---|---|---|
| WO | WO200926134 A2 | 2/2009 |
| WO | WO201272183 A1 | 6/2012 |

\* cited by examiner

SYSTEMS AND METHODS TO CONTROL COLD TRANSIENT RESPONSE VIA AIR ASSIST

CROSS-REFERENCE TO RELATED APPLICATIONS

This application claims the benefit of Provisional Application No. 62/434,775, filed Dec. 15, 2016, the entire substance of which is incorporated herein by reference.

TECHNICAL FIELD

The present disclosure relates to a control system and method to control cold transient response of an engine.

BACKGROUND

Gas power generation systems are typically provided with control systems to monitor and control power generation operations. Generally, such gas power generator systems can face aggressive transient requirements, which may be particularly challenging in the case of cold engines of such systems. One method that may assist the transient performance is to regulate fuel flow to a combustion chamber of the engine.

U.S. Pat. No. 8,652,007, hereinafter referred to as the '007 patent, describes, generally speaking, a pressure accumulation system for an internal combustion engine. According to the '007 patent, the pressure accumulation system can be applied for an internal combustion engine provided with an exhaust shut-off valve mounted in an exhaust path and provided to prevent exhaust pressure from excessively increasing, when a pressurized gas is contained in a pressure accumulation container. The system of the '007 patent includes a pressure accumulation tank into which a gas can be introduced from that portion of an exhaust path, a sensor for detecting the exhaust pressure, and an Exhaust Gas Recirculation (EGR) valve, controlled based on the detection value from the exhaust gas sensor such that the pressure in that portion of the exhaust path, which is on the upstream of the exhaust shut-off valve, is limited below a predetermined exhaust gas upper limit value ($P_{max}$) when gas is contained in the pressure accumulation tank.

SUMMARY OF THE DISCLOSURE

In one aspect, the present disclosure provides a control system to control cold transient response of an engine by controlling air assist from a compressed air source provided to a turbocharger. The control system includes a memory configured to store a transient trigger to provide compressed air from the compressed air source, via an exhaust log, to the turbocharger to boost a speed of a turbine of the turbocharger. The control system further includes a controller in communication with the memory. The controller is configured to determine at least one desired operating characteristic associated with upstream or downstream operation of the engine relative to the turbocharger. The controller is further configured to receive data corresponding to at least one actual operating characteristic associated with the upstream or downstream operation of the engine relative to the turbocharger. The controller is further configured to compare the determined at least one desired operating characteristic with the received data corresponding to at least one actual operating characteristic. The controller is further configured to control the air assist from the compressed air source provided to the turbocharger based on whether the comparison of the determined at least one desired operating characteristic with the received data corresponding to at least one actual operating characteristic meets or exceeds the transient trigger.

In another aspect, the present disclosure provides a computer-implemented method of controlling transient response of an engine by controlling air assist from a compressed air source provided to a turbocharger. The computer-implemented method includes determining at least one desired operating characteristic associated with upstream or downstream operation of the engine relative to the turbocharger. The method further includes receiving data corresponding to at least one actual operating characteristic associated with the upstream or downstream operation of the engine relative to the turbocharger. The method further includes comparing the determined at least one desired operating characteristic with the received data corresponding to at least one actual operating characteristic. The method further includes controlling the air assist from the compressed air source provided to the turbocharger based on whether the comparison of the determined at least one desired operating characteristic with the received data corresponding to at least one actual operating characteristic meets or exceeds a transient trigger.

In yet another aspect, the present disclosure provides a method of controlling transient response of an engine by controlling air assist from a compressed air source provided to a turbocharger. The method includes determining, using a controller, at least one desired operating characteristic associated with upstream or downstream operation of the engine relative to the turbocharger. The method further includes receiving, using the controller, data corresponding to at least one actual operating characteristic associated with the upstream or downstream operation of the engine relative to the turbocharger. The method further includes comparing, using the controller, the determined at least one desired operating characteristic with the received data corresponding to at least one actual operating characteristic. The method further includes controlling, using the controller, the air assist from the compressed air source provided to the turbocharger based on whether the comparison of the determined at least one desired operating characteristic with the received data corresponding to at least one actual operating characteristic meets or exceeds a transient trigger.

Other features and aspects of this disclosure will be apparent from the following description and the accompanying drawings.

DETAILED DESCRIPTION

Figure 1:
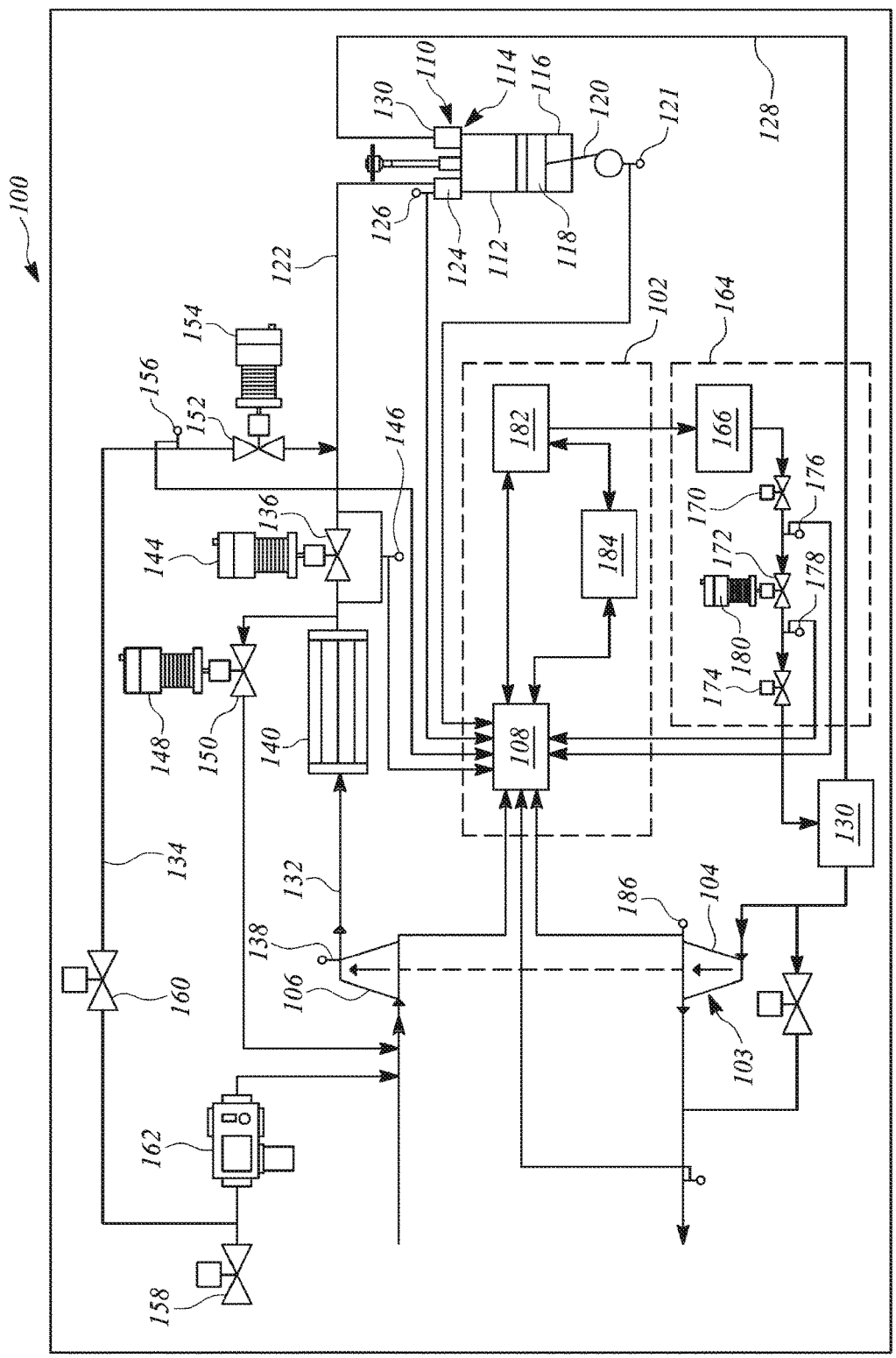
FIG. 1 is a schematic of a generator including an engine and control system thereof, according to one or more embodiments of the present disclosure.

The description set forth below in connection with the appended drawings is intended as a description of various embodiments of the described subject matter and is not necessarily intended to represent the only embodiment(s). In certain instances, the description includes specific details for the purpose of providing an understanding of the described subject matter. However, it will be apparent to those skilled in the art that embodiments may be practiced without these specific details. In some instances, structures and components may be shown in block diagram form in order to avoid obscuring the concepts of the described subject matter. Wherever possible, the same reference numbers will be used throughout the drawings to refer to the same or the like parts.

Any reference in the specification to "one embodiment" or "an embodiment" means that a particular feature, structure, characteristics, operation, or function described in connection with an embodiment is included in at least one embodiment. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments, and it is intended that embodiments of the described subject matter can and do cover modifications and variations of the described embodiments.

It must also be noted that, as used in the specification, appended claims and abstract, the singular forms "a," "an," and "the" include plural referents unless the context clearly dictates otherwise. That is, unless clearly specified otherwise, as used herein the words "a" and "an" and the like carry the meaning of "one or more" Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the described subject matter to any particular orientation or configuration. Furthermore, terms such as "first," "second," "third," etc. merely identify one of a number of portions, components, points of reference, operations and/or functions as described herein, and likewise do not necessarily limit embodiments of the described subject matter to any particular configuration or orientation.

Generally speaking, embodiments of the present disclosure can provide a control system and a method to control cold transient response of an engine, including a gas fuel engine, such as a natural gas engine. Embodiments of the disclosed subject matter can also provide a control system and a method to control air assist for control of compressed air provided to the engine. More specifically, embodiments of the present disclosure can control air assist from a compressed air source provided to a turbocharger based on comparison of at least one desired operating characteristic with received data corresponding to at least one actual operating characteristic. The operating characteristics can be associated with upstream or downstream operation of the engine relative to the turbocharger, generally speaking.

FIG. 1 illustrates a schematic of a generator 100 for illustrating and understanding various aspects and embodiments of the disclosed subject matter. The generator 100 can be a gas powered generator in one or more embodiments of the disclosed subject matter, though the generator 100 is not so limited.

As illustrated in FIG. 1, the generator 100 can include a control system 102 to control various operations and functions of the generator 100. The generator 100 can also include a turbocharger 103 having a turbine 104 and a compressor 106. The turbine 104 may be operably coupled to the compressor 106 by a shaft (not shown). The generator 100 may also include a controller 108. Though not expressly shown, the controller 108 may be part of the control system 102. The generator 100 may further include an engine 110. Generally speaking, the control system 102 can monitor operations of the turbine 104 using one or a plurality of sensors that detect, for example, a power output of the turbine 104, a rotational speed of the compressor 106 and/or the turbine 104, a turbine inlet temperature, a turbine exhaust temperature, a fuel flow rate to the engine 110, compressor pressure, and other operating conditions.

In one embodiment, the engine 110 may be internal combustion engine that uses a gaseous fuel for combustion. It may be contemplated that although the engine 110 may be described in terms of utilization in a gas powered generator using gaseous fuel, the engine 110 may alternatively be used with other types of fuels without any limitations.

The engine 110 can include a cylinder 112 having a Top Dead Center (TDC) 114 and a Bottom Dead Center (BDC) 116, for instance. The cylinder 112 can be provided with a reciprocating piston 118 connected to a crank shaft 120 with a sensor 121, for instance. An inlet line 122 can lead to an intake manifold 124 of the cylinder 112. The intake manifold 124 can be provided with at least one sensor 126, for instance, to measure an intake manifold air temperature (IMAT) and/or an intake manifold air pressure (IMAP). An outlet line 128 can extend from an exhaust manifold 130 of the cylinder 112. The inlet line 122 can be connected with an intake air line 132 and a fuel supply line 134. The intake air line 132 can supply air from a source (not shown) to the compressor 106 through a filter (not shown).

Further, the compressor 106 can be adapted to supply compressed air to the cylinder 112 via a throttle valve 136, for instance. The throttle valve 136 can be actuated by a throttle valve actuator 144. A sensor 146, for instance, can be provided at the throttle valve 136 (e.g., at an input and an output) to measure a throttle delta pressure. In an example, the throttle valve 136 can be a unidirectional valve, connected to an after cooler 140, for instance. In some examples, at least one sensor 138 may be provided at the compressor 106, for instance, to measure pressure and/or temperature of the intake air exiting the compressor 106. Also, the after cooler 140 may be connected between the compressor 106 and the throttle valve 136 of the control system 102 to cool the compressed air by absorbing heat therefrom. Further, the intake air line 132 may be provided with one or more by-pass valve actuators, such as a by-pass valve actuator 148 and a by-pass valve 150, such that the by-pass valve 150 can be operated by actuation of the by-pass valve actuator 148. In the present example, the by-pass valve 150 can be opened or shut-off based on a signal from the controller 108 of the control system 102. Likewise, in one or more embodiments, some or all of the other valves and respective valve actuators described herein, such as those illustrated in FIG. 1, can be controlled based on respective signals from the controller 108.

The inlet line 122 may be further adapted to supply a gaseous fuel to the intake manifold 124 through the fuel supply line 134. The gaseous fuel can be supplied from a source (not shown) through, for instance, a gas actuator valve 152, activated by a gas actuator 154, to the intake manifold 124. A sensor 156 can be provided at the fuel supply line 134, for instance, to measure pressure of the gaseous fuel at the gas actuator valve 152. The fuel supply line 134 may further be provided with a main gas shut-off valve 158, an auxiliary gas shut-off valve 160, and a fuel metering device 162. The main gas shut-off valve 158 and the auxiliary gas shut-off valve 160 may be configured to cut-off the fuel supply through the fuel supply line 134, and the fuel metering device 162 may be configured to measure a quantity or mass of the gaseous fuel being supplied to the intake manifold 124.

In an embodiment, the generator 100 can include an air assist system 164. Hereinafter, the term "air assist system" may be interchangeably referred to as "air assist." The air assist system 164 can include a compressed air tank 166 that may be placed in fluid communication with the turbine 104, for instance, in indirect fluid communication. Generally speaking, the air assist system 164 can be configured to supply additional air during transient conditions of the engine 110 of the generator 100, for instance.

According to one or more embodiments, the air assist system 164 can be configured to supply air from the compressed air tank 166 through a regulator valve 170, an air assist valve 172, an Air Assist Shut-Off Valve (AASOV) 174, and the exhaust manifold 130, for instance, to the turbine 104, in response to or in anticipation of a transient condition of the engine 110. At least one sensor 176 may be provided between the regulator valve 170 and the air assist valve 172 to measure a temperature and/or pressure of the compressed air passing therethrough. Further, at least one sensor 178 can be provided between the air assist valve 172 and the AASOV 174 to measure temperature and/or pressure of the compressed air passing therethrough. The air assist valve 172 can be actuated by an air assist actuator 180 connected to the air assist valve 172. The compressed air can be made to pass through the exhaust manifold 130, for instance, to recover heat from the exhaust gases, where the heated compressed air can be supplied to the turbine 104. The turbine 104 can be further connected to an exhaust system (not expressly shown) to release exhaust gases, including NOx gas, output by the engine 110. In one or more examples, the turbine 104 may be connected with the compressor 106 to supply air from the turbine 104 to the intake air line 132.

In one or more embodiments, the controller 108 may be configured to determine a desired Intake Manifold Air Pressure (IMAP), a desired Intake Manifold Air Temperature (IMAT), and/or desired Throttle Differential Pressure to generate a desired output from the turbine 104 based on a desired or current output from the engine 110. The control system 102 may include a memory 184 to store the desired IMAP, the desired IMAT, and the desired Throttle Differential Pressure to produce a desired output from the turbine 104. Further, the control system 102 can be configured to determine a transient trigger of a transient condition of the generator 100 and/or the engine 110. Alternatively, the transient trigger may be set. In the present example, the transient condition can be a cold transient condition of the engine 110. The term "transient trigger," as used herein, may refer to a condition of the turbine 104 and/or the engine 110, such as speed and/or load, that causes the speed to reduce and/or the load to increase according to predetermined transient qualifying conditions. The value or values of the transient trigger or triggers can also be stored in the memory 184.

In one or more embodiments, the controller 108 can be configured to control operations of the generator 100 to better handle, for instance, overcome, a transient condition of the engine 110, for instance, a cold transient condition of the engine 110. In this regard, the controller 108 can receive feedback signals from the sensors 121, 126, 138, 146, 156, arranged at the crank shaft 120, the intake manifold 124, the compressor 106, the throttle valve 136 and the fuel supply line 134, respectively, to control operation of the engine 110 for generating power. The controller 108 may be further configured to receive feedback signals from a sensor 186 arranged at the turbine 104. Optionally, the generator 100 may not have a sensor 186 arranged at the turbine 104.

In one or more examples, the controller 108 can include at least one sub-controller or module 182, which may be a Proportional Integral (PI) controller 182, for instance. The sub-controller 182 can be configured to be in communication with the controller 108 and the memory 184. The sub-controller 182 can be configured to receive a signal indicative of a transient condition of the engine 110 from the memory 184. In general, the sub-controller 182 can be configured to control, including prevent, a transient condition of the engine 110 by actuation of any one or combination of the air assist system 164 and the throttle valve 136. In order to control the transient condition by actuation of any one or combination of the air assist system 164 and the throttle valve 136, the sub-controller 182 can determine whether a comparison of at least one desired operating characteristic with at least one actual operating characteristic is equal to or exceeds the transient trigger.

In particular, the sub-controller 182 can receive desired operating characteristics associated with an upstream operation and/or a downstream operation of the engine 110 relative to the turbocharger 103. The desired operating characteristics can include, but are not limited to, a desired speed of the turbine 104 of the turbocharger 103. Further, the sub-controller 182 can be configured to receive data corresponding to actual operating characteristics associated with the upstream operation and/or the downstream operation of the engine 110 relative to the turbocharger 103. The actual operating characteristics can include an actual speed of the turbine 104 of the turbocharger 103, for instance. The sub-controller 182 can be further configured to compare the received desired operating characteristics with the received data corresponding to actual operating characteristics. When the difference between the determined desired operating characteristics and the actual operating characteristics is equal to or exceeds the value of the transient trigger, the sub-controller 182 can control the air assist system 164 to provide (or provide more) compressed air from the compressed air tank 166 to the turbocharger 103. Likewise, when the difference between the determined desired operating characteristics and the actual operating characteristics is not equal to or above the value of the transient trigger, the sub-controller 182 may provide control so as to not provide compressed air from the compressed air tank 166, or may begin reducing the amount of compressed air provided from the compressed air tank 166.

Figure 2:
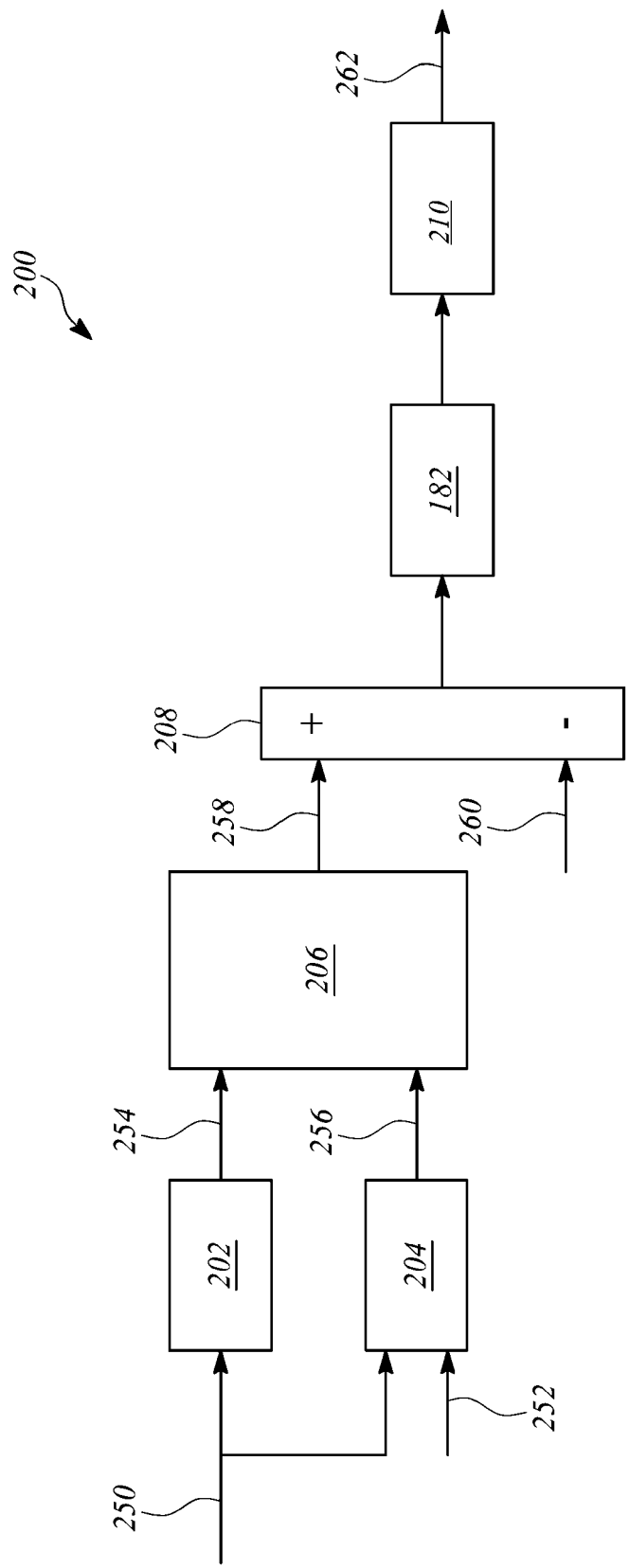
FIG. 2 is a schematic of a controller of a control system, according to one or more embodiments of the present disclosure.

FIG. 2 illustrates a schematic of a controller 200 of a control system, such as control system 102, according to one or more embodiments of the present disclosure.

The controller 200 may be one of a number of possible variations of the controller 108 described in FIG. 1, according to one or more embodiments of the present disclosure.

In this embodiment, the sub-controller 182 can be configured as a PI controller and can compare the desired turbine speed with the actual turbine speed to determine a transient condition associated with the engine 110. The sub-controller 182 in the form of the PI controller can obtain the desired turbine speed from the memory 184, for instance. In one or more examples, the turbocharger 103 may include two sensors configured to sense speed of the turbine 104 from two different positions, and therefrom an average speed of the turbine 104 may be determined by the controller 108, for instance, and stored in the memory 184, for example.

According to one or more embodiments of the disclosed subject matter, the desired turbine speed can be determined by a mapping methodology. Inputs to map can be a desired compressor mass flow and a desired pressure ratio, each of which can be based on a desired IMAP and a desired throttle differential pressure. The desired IMAP and the desired throttle differential pressure can be determined and stored in the memory 184, for instance, in communication with the controller 108.

For example, at a block 202, the desired IMAP value 250 can be received to determine a desired compressor mass flow value 254, for instance. Block 202 may represent a module, process, algorithm, and/or circuitry to apply an expanded speed density function or operation, for instance, to achieve a desired compressor mass flow. The desired compressor mass flow 254 may be output from block 202.

At a block 204, the desired IMAP 250 and the desired throttle differential pressure value(s) 252 can be received to determine a desired compressor pressure ratio value 256, for instance. The block 204 may represent a module, process, algorithm, and/or circuitry to apply a desired compressor pressure ratio calculation to the received inputs. Thus, block 204 can output the desired compressor pressure ratio value 256.

At a block 206, the inputs, which can include the desired compressor mass flow value 254 and the desired compressor pressure ratio value 256, can be received by the block 206 for application of a compressor mapping module, process, algorithm, and/or circuitry to determine a desired turbine speed 258.

Actual turbine speed can be determined based on a sensor, such as sensor 186, at the turbocharger 103. Such actual turbine speed 260 can be provided to a block 208. The desired turbine speed 258 can be provided to the block 208 from block 206.

At the block 208, the inputs of the desired turbine speed 258 and the actual turbine speed 260 can be received to determine a turbine speed error value, which can be output from block 208. The inputs of the desired turbine speed 258 and the actual turbine speed 260 may also be stored in the memory 184. It may be understood that the turbine speed error value output by the module, process, algorithm, and/or circuitry associated with the block 208 can be the difference between the desired turbine speed 258 and the turbine actual speed 260.

The turbine speed error value can be determined by the block 208 and communicated to the sub-controller 182 in the form of a PI controller, for instance, which can be configured to communicate a signal (or signals) to block 210, which may process the output of the sub-controller 182, for instance, according to an actuator air assist area to position map, to determine and output a control signal 262. The control signal 262 may be an air assist position command, which, generally speaking, can control whether (and in what amount, rate, etc.) compressed gas from the compressed air tank 166 is provided to the exhaust manifold 130. Of course, the turbine speed error value may also cause control of the air assist system 164 (e.g., by way of control signal 262) to close the air assist valve 172 to stop or slow the release of compressed air from the compressed air tank 166.

For example, the air assist actuator 180 can be controlled so as to actuate the air assist valve 172 to open (or close) in proportion to the error value output by block 208. Therefore, the air assist valve 172 and the compressed air tank 166 can supply the compressed air to the turbocharger 103, through the exhaust manifold 130, which can drive the turbine 104 to increase the speed thereof. Thus, the compressed air provided through the exhaust manifold 130 can boost the speed of the turbine 104 of the turbocharger 103.

With the air assist valve 172 opened, the speed of the turbine 104 can be caused to increase. Once the speed of the turbine 104 gets relatively close to the desired speed, the turbine speed error value will get smaller and the sub-controller 182 in the form of the PI controller can start closing the air assist valve 172, again, by way of the control signal 262 output by block 210. Once the speed of the turbine 104 reaches to a steady state, for instance, the turbine speed error value may be equal to zero or substantially zero, and the sub-controller 182 in the form of the PI controller can cause the air assist valve 172 to close via the control signal 262.

Figure 3:
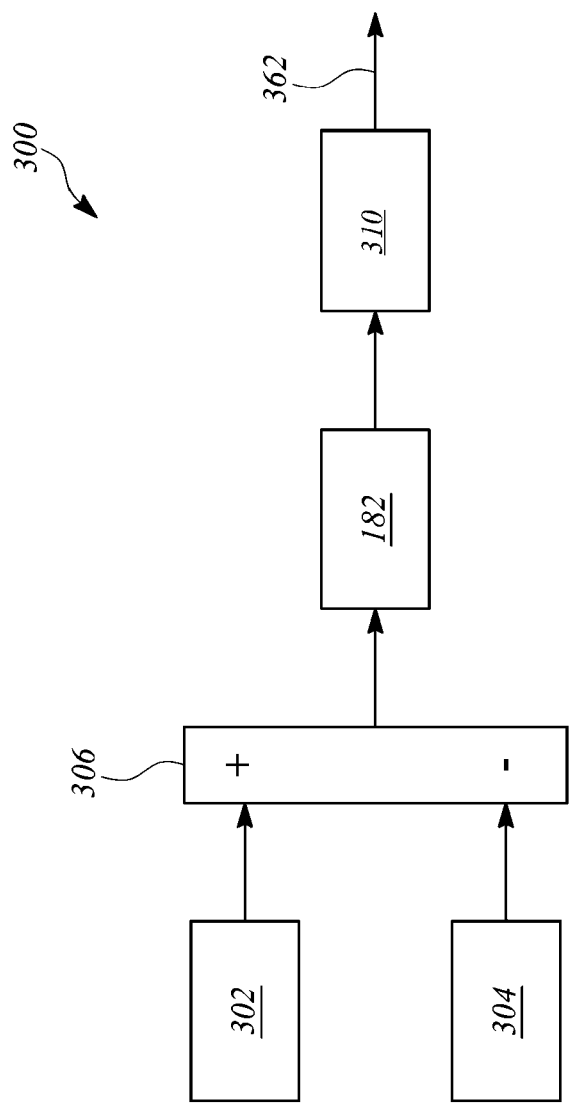
FIG. 3 is a schematic of a controller of a control system, according to one or more embodiments of the present disclosure.

FIG. 3 is a schematic of a controller 300 of the control system 102, according to another embodiment of the present disclosure. The controller 300 can be one of the possible variations of the controller 108 as described in FIG. 1. In this embodiment, the controller 300 can be configured to compare a sum of a desired IMAP and a desired throttle differential pressure with a sum of an actual IMAP and an actual throttle differential pressure.

At a block 302, which may represent a module, process, algorithm, and/or circuitry, a sum of desired IMAP and desired throttle differential pressure can be obtained. The sum can be provided from block 302 to block 306. Further, at a block 304, which may represent a module, process, algorithm, and/or circuitry, a sum of actual IMAP and actual throttle differential pressure can be obtained. The sum can be provided from block 304 to block 306. The actual IMAP can be obtained from a corresponding sensor or sensors, such as described relative to FIG. 1. Likewise, the actual throttle differential pressure can be obtained from a corresponding sensor or sensors, such as described relative to FIG. 1.

At a block 306, which may represent a module, process, algorithm, and/or circuitry, a comparison of the sum of the desired IMAP and the desired throttle differential pressure (from the block 302) with the sum of the actual IMAP and the actual throttle differential pressure (from the block 304) can be performed. The comparison may provide an error value, which is the difference between the sum of the desired IMAP and the desired throttle differential pressure and the sum of the actual IMAP and the actual throttle differential pressure.

As the error value is determined, the sub-controller 182 in the form of a PI controller, for instance, can communicate a signal (or signals) to a block 310, which may process the output of the sub-controller 182, for instance, according to an actuator air assist area to position map, to determine and output a control signal 362. The control signal 362 may be an air assist position command, which, generally speaking, can control whether (and in what amount, rate, etc.) compressed gas from the compressed air tank 166 is provided to the exhaust manifold 130.

Generally speaking, the control signal 362 can be output to the air assist system 164 to control opening of the air assist valve 172 to release compressed air from the compressed air tank 166 when the error value is determined to be at or above a predetermined threshold to open the air assist valve 172. The air assist actuator 180 can actuate the air assist valve 172 to open proportionally to the error value, for instance, and thereby supply compressed air to the turbocharger 103, through the exhaust manifold 130, which can drive the turbine 104, and increase the speed of the turbine 104. Thus, the compressed air provided through the exhaust manifold 130 can boost the speed of the turbine 104 of the turbocharger 103.

With the air assist valve 172 opened based on the control signal 362, the speed of the turbine 104 can be caused to increase. Once the speed of the turbine 104 gets relatively close to a desired speed, the error value will get smaller and the sub-controller 182 in the form of the PI controller, for instance, can start closing the air assist valve 172 by way of the control signal 362. Once the speed of the turbine 104 reaches to a steady state, the error value may be equal to or substantially equal to zero, for instance, and the sub-controller 182 in the form of the PI controller can close the air assist valve 172 by way of the control signal 362.

Figure 4:
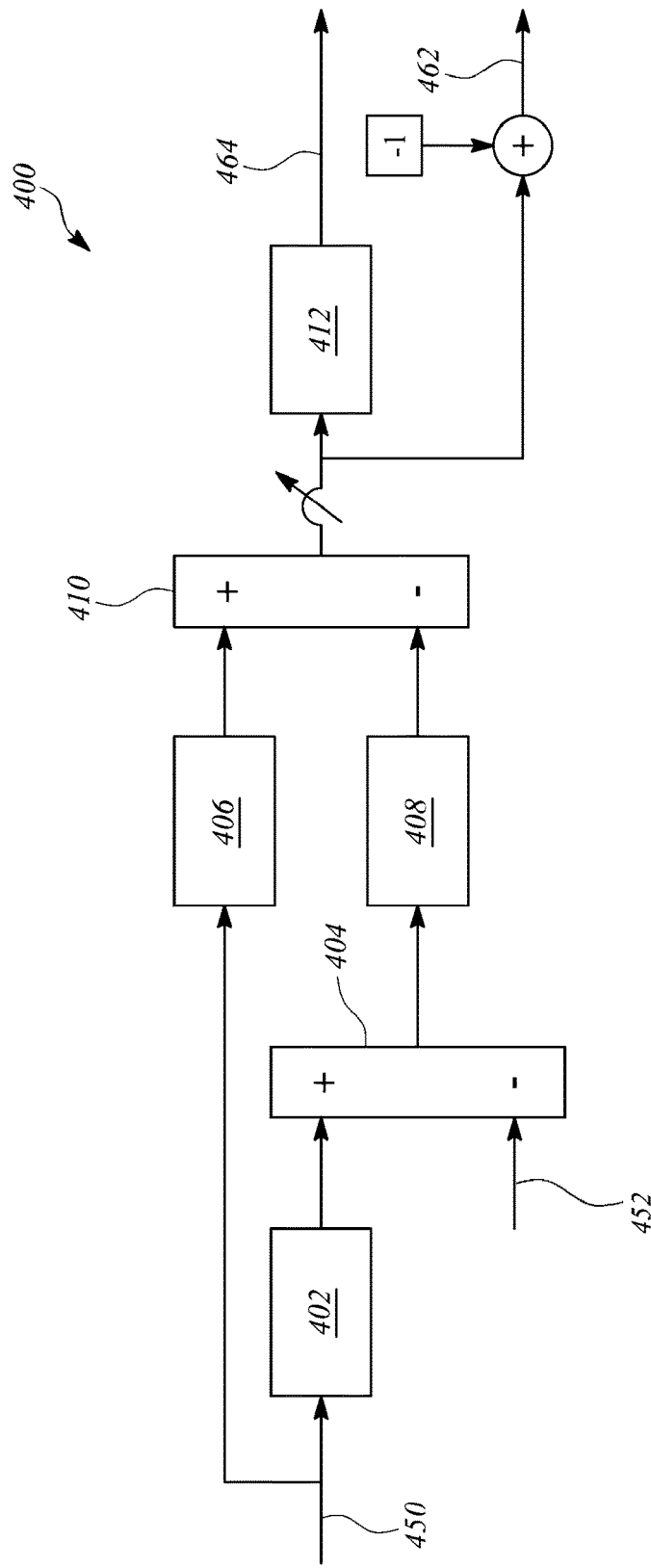
FIG. 4 is a schematic of a controller of a control system, according to one or more embodiments of the present disclosure.

FIG. 4 is a schematic of a controller 400 of the control system 102, according to another embodiment of the present disclosure. In this embodiment, the controller 400 can be one of the possible variations of the controller 108 as described in FIG. 1.

In this embodiment, the desired IMAP 450 can be compared with the actual IMAP 452. More specifically, the desired IMAP 450 may be provided to a positive input of a block 404, and the actual IMAP 452 may be provided to a negative input of the block 404. The desired IMAP 450 may be provided indirectly to the block 404, while the actual IMAP 452 may be provided directly to the block 404. Optionally, the desired IMAP 450 can be obtained from the memory 184, for instance. Incidentally, the desired IMAP 450 may also be provided to block 406, discussed in more detail below.

At a block 402, which may represent a module, process, algorithm, and/or circuitry, the desired IMAP 450 can be received, for instance, from the memory 184. Block 402 may condition the desired IMAP 450 prior to receipt at block 404. For example, block 402 may apply a pre-filter. Alternatively, a pre-filter may not be applied to the desired IMAP 450 prior to receipt thereof by the block 404.

At the block 404, which may represent a module, process, algorithm, and/or circuitry, the actual IMAP can be received, as determined from various sensors, such as described above. As discussed above, the desired IMAP 450 can be received either directly or indirectly. At the block 404, the desired IMAP and the actual IMAP values can be compared to determine an intermediate error value. The intermediate error value may be provided from block 404 to block 408.

At a block 406, which may represent a module, process, algorithm, and/or circuitry, the desired IMAP value can be received and processed at a block 406, which may be or include a feedforward controller. The output of block 406 can be provided to an input of a block 410, for instance, a positive input of the block 410.

Further, at a block 408, which may represent a module, process, algorithm, and/or circuitry, the determined intermediate error value output from block 404 can be received and processed at the block 408, which may be a feedback controller. The output of block 408 can be provided to an input of the block 410, for instance, a negative input of the block 410.

At a block 410, which may represent a module, process, algorithm, and/or circuitry, an error value can be determined, for instance, based on a multiplication of the desired IMAP (from the block 406) and the intermediate error value (from the block 408). The error value obtained by the block 410 (e.g., by multiplication) can be a varying command, such as a varying throttle area command. Optionally, the varying command can vary from 0 to 2, for instance.

At a block 412, which may represent a module, process, algorithm, and/or circuitry, based on the varying throttle area command, a control signal 464 can be generated and communicated, for instance, to the throttle valve actuator 144 for activating the throttle valve 136 to supply air through the throttle valve 136. The block 412 may process the varying command according to an actuator area to position map, for instance. Further, the control signal 464 may be a throttle position command, for instance, to control the throttle valve 136.

The throttle position command for actuation of the throttle valve 136 can be settable and preset, for instance, limited to a range of about 0 to 1. For instance, if the throttle area command from block 410 is determined to be less than or equal to 1, then the throttle position command (i.e., control signal 464) can be set to that value. If the throttle area command from block 410 is determined to be more than 1, then the throttle position command is configured to be set to 1, since the throttle position command can be capped at 1.

Further, the control can wait for an instruction command from the throttle valve actuator 144 until the throttle valve 136 is saturated, i.e., if the throttle is set to 1. In case of throttle saturation, the control can determine the requirement of more boost and instruct the air assist system 164 to activate to provide additional air from the compressed air tank 166. For example, if the throttle area command output from block 410 is 2, the control can subtract "1" at an adder, which gives "1" as a control signal 462 for output to the air assist system 164 to open the air assist valve 172. In other words, the control can wait for the throttle valve 136 to open completely before communicating the control signal 462 to open the air assist valve 172.

Thus, the air assist valve 172 and the compressed air tank 166 can supply the compressed air to the turbocharger 103, through the exhaust manifold 130, which can drive the turbine 104, thereby increasing the speed of the turbine 104. The compressed air provided through the exhaust manifold 130 can boost the speed of the turbine 104 of the turbocharger 103.

With the throttle valve 136 and the air assist valve 172 opened, the speed of the turbine 104 can be caused to increase. Once the speed of the turbine 104 gets relatively close to the desired speed, the error value from the block 404 gets smaller, and the control can first start closing the air assist valve 172, then the throttle valve 136, for instance. Once the speed of the turbine 104 reaches a steady state, the error value may be equal to zero or substantially equal to zero, and the control can close both the throttle valve 136 and the air assist valve 172.

Figure 5:
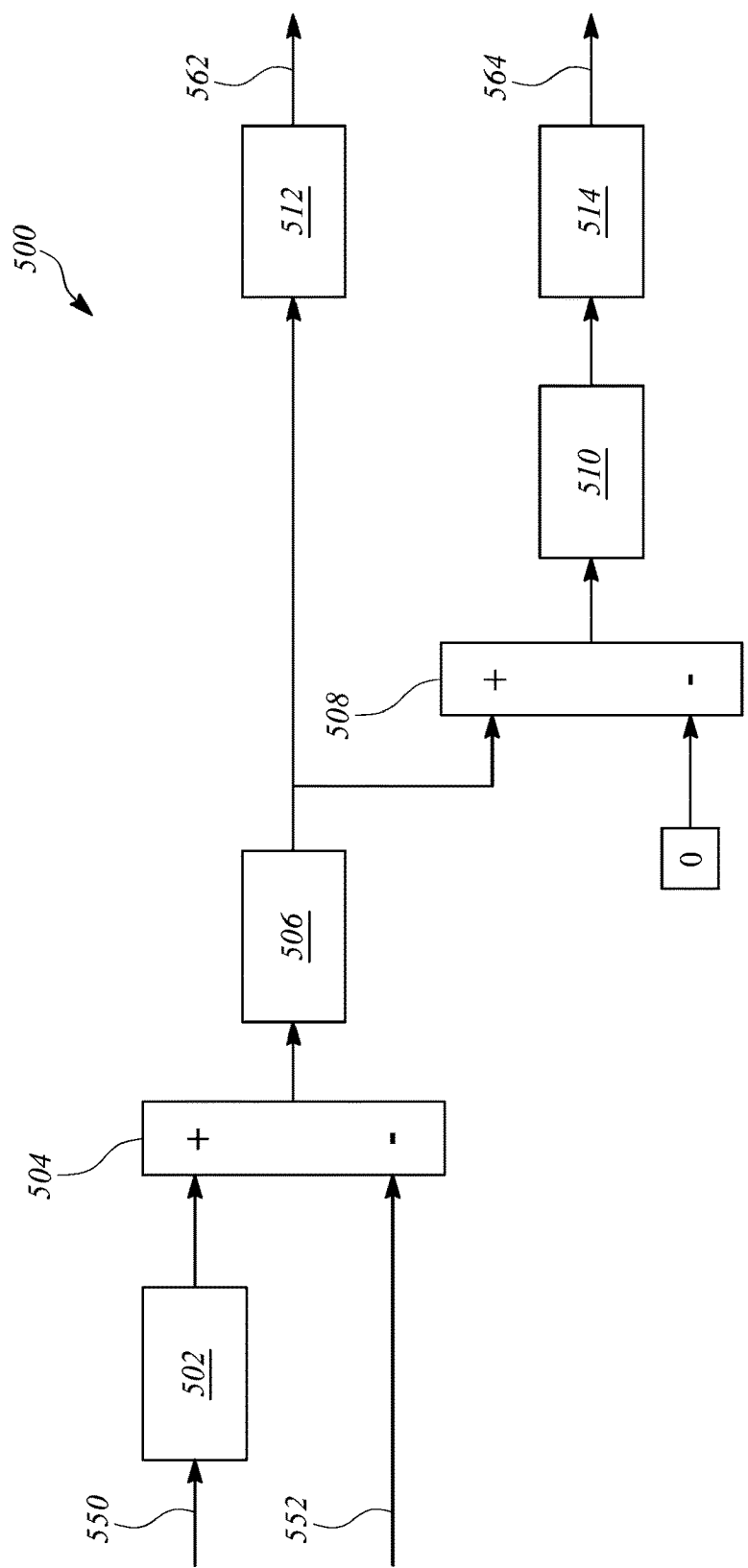
FIG. 5 is a schematic of a controller of a control system, according to one or more embodiments of the present disclosure.

FIG. 5 is a schematic of a controller 500 of the control system 102, according to another embodiment of the present disclosure. The controller 500 is one of a number of possible variations of the controller 108 as described in FIG. 1. In this embodiment, the controller can implement simultaneous or substantially simultaneous actuation of the throttle valve 136 and the air assist valve 172. In this embodiment, the controller 500 can use a comparison of the desired IMAP with the actual IMAP.

At a block 502, which may represent a module, process, algorithm, and/or circuitry, the desired IMAP 550 can be received and communicated to a block 504. Generally speaking, block 502 may apply a pre-filter to the desired IMAP 550. Alternatively, the desired IMAP 550 may not be subjected to a pre-filter. The output of block 502 may be provided to an input of a block 504, for instance, a positive terminal of block 504.

At the block 504, which may represent a module, process, algorithm, and/or circuitry, the actual IMAP value 552 can also be received, for example, from the memory 184. The actual IMAP value 552 may be provided to a negative input of the block 504, for instance.

The block 504 can determine an error value based on a difference between values of the desired IMAP 550 and the actual IMAP 552. The error value can be output from block 504 to a block 506.

At a block 506, which may represent a module, process, algorithm, and/or circuitry, the determined error value can be received and processed. For example, block 506 may be or include a feedback controller (e.g., a PI controller) that processes the error value signal accordingly. The error value can be output to a block 510 and a block 508.

At the block 508, the determined error value can be received and compared against a "0" value. For example, the determined error value can be received at a positive terminal, for instance, of the block 508. The "0" value can be provided at a negative terminal of the block 508, for instance.

At a block 510, which may represent a module, process, algorithm, and/or circuitry, a signal indicative of the remaining throttle area can be generated by a controller 182 (not expressly shown), which may be a PI controller. The signal can be to open the throttle value 136.

At a block 514, which may represent a module, process, algorithm, and/or circuitry, the signal from the block 510 can be processed according to a throttle area to position map, for instance. The output of the block 514 can be output as a control signal 564, for instance, a throttle position command signal. Such control signal 564 may be constrained to a range, for instance, from zero (0) to one (1). Further, the control signal 564 may be communicated to the throttle valve actuator 144 to open the throttle valve 136 based on the remaining throttle area, for instance.

At a block 512, which may represent a module, process, algorithm, and/or circuitry, output of block 506 can be received and subjected to processing according to an air assist area to position map, for instance. The block 512 can output a control signal 562, for instance, an air assist position command signal. Such control signal 562 may be constrained to a range, for instance, from zero (0) to one (1). Further, the control signal 562 can be output to the air assist system 164 to open the air assist valve 172 based on the determined error value, as received from the block 506.

Thus, for example, with the air assist valve 172 (and the throttle valve 136) opened, the speed of the turbine 104 can be caused to increase. Once the speed of the turbine 104 gets relatively close to the desired speed, the error value will get smaller, and the controller 500 can start closing the air assist valve 172 (and the throttle valve 136, if opened). Once the speed of the turbine 104 reaches a steady state, the error value may be equal to zero or substantially equal to zero, and the controller 500 can close the air assist valve 172 (and the throttle valve 136).

INDUSTRIAL APPLICABILITY

The present disclosure relates to the control system 102 and methods 600, 700 to control cold transient response of generators, such as the generator 100, which may be a gas powered generator, for instance, particularly with a gas fuel engine such as a natural gas fuel engine.

The control system 102 can control transient response of the generator 100 by controlling air assist from the compressed air source provided to the turbocharger 103. The control system 102 can include the memory 184 configured to store a transient trigger to provide compressed air from the compressed air source, via an exhaust log, to the turbocharger 103 to boost the speed of the turbine 104 of the turbocharger 103. The control system 102 can further include a controller 182, for instance, a PI controller, in communication with the memory 184. Some or all of the controller 182 may be implemented using circuitry.

The controller 182 can be configured to determine at least one desired operating characteristic associated with upstream or downstream operation of the generator 100 relative to the turbocharger 103. The controller 182 may be further configured to receive data corresponding to at least one actual operating characteristic associated with the upstream or downstream operation of the generator 100 relative to the turbocharger 103. The controller 182 may be further configured to compare the determined at least one desired operating characteristic with the received data corresponding to at least one actual operating characteristic. The controller 182 may be further configured to control the air assist from the compressed air source provided to the turbocharger 103 based on whether the comparison of the determined at least one desired operating characteristic with the received data corresponding to at least one actual operating characteristic meets or exceeds the transient trigger.

Figure 6:
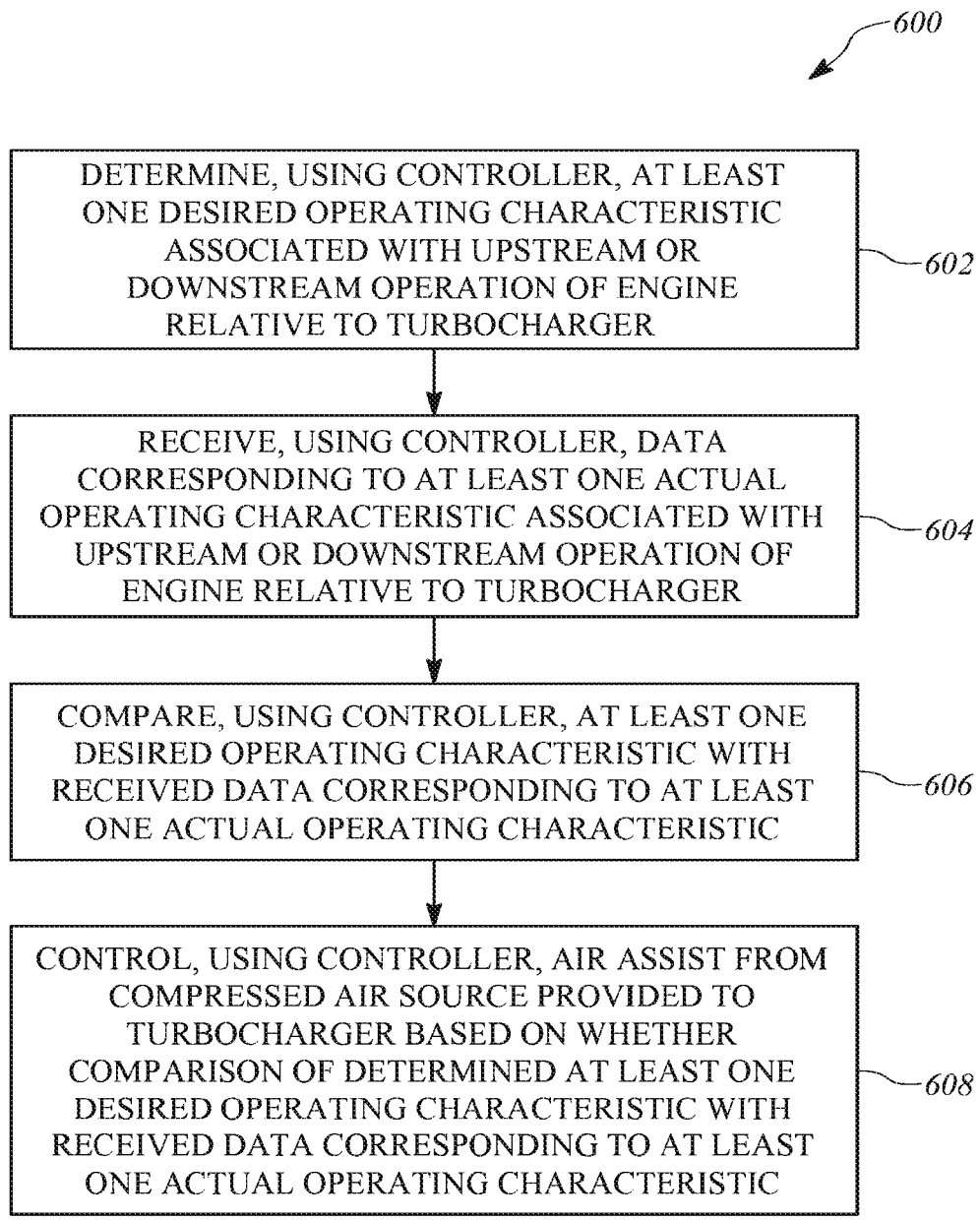
FIG. 6 is a flowchart of a method of controlling air assist provided to an engine, according to one or more embodiments of the present disclosure.

FIG. 6 illustrates a flowchart of a method 600 for controlling transient response of the engine 110 by controlling the air assist 164 from the compressed air source (e.g., compressed air tank 166) provided to the turbocharger 103, according to one or more embodiments of the present disclosure.

At a block 602, the method 600 can include determining, using a controller (which may be implemented entirely or in part via circuitry), at least one desired operating characteristic associated with upstream or downstream operation of the engine 110 relative to the turbocharger 103.

At a block 604, the method 600 can include receiving, using the controller, data corresponding to at least one actual operating characteristic associated with the upstream or downstream operation of the engine 110 relative to the turbocharger 103.

At a block 606, the method 600 can include comparing, using the controller, the determined at least one desired operating characteristic with the received data corresponding to at least one actual operating characteristic.

At a block 608, the method 600 can include controlling, using the controller, the air assist 164 from the compressed air source provided to the turbocharger 103 based on whether the comparison of the determined at least one desired operating characteristic with the received data corresponding to at least one actual operating characteristic meets or exceeds a transient trigger.

As described, the at least one desired operating characteristic can include desired speed of the turbocharger 103, and the at least one actual operating characteristic can include actual speed of the turbocharger 103. In one example, controlling the air assist can include outputting a control signal to control the air assist valve 172, where the control signal can trigger the air assist valve 172 to open to increase the actual speed of the turbocharger 103, and the control signal can trigger the air assist valve 172 to close as the actual speed of the turbocharger 103 approaches the desired speed of the turbocharger 103. In another example, controlling the air assist can include outputting the control signal to control the air assist valve 172, where the control signal can trigger the air assist valve 172 to open to allow more compressed air to be provided to the turbocharger 103, and the control signal can trigger the air assist valve 172 to close as a sum of the actual IMAP and the actual throttle differential pressure approaches a sum of the desired IMAP and the desired throttle differential pressure. In other example, controlling the air assist can include opening the air assist valve 172 to provide compressed air from the compressed air source and opening the throttle valve 136.

Figure 7:
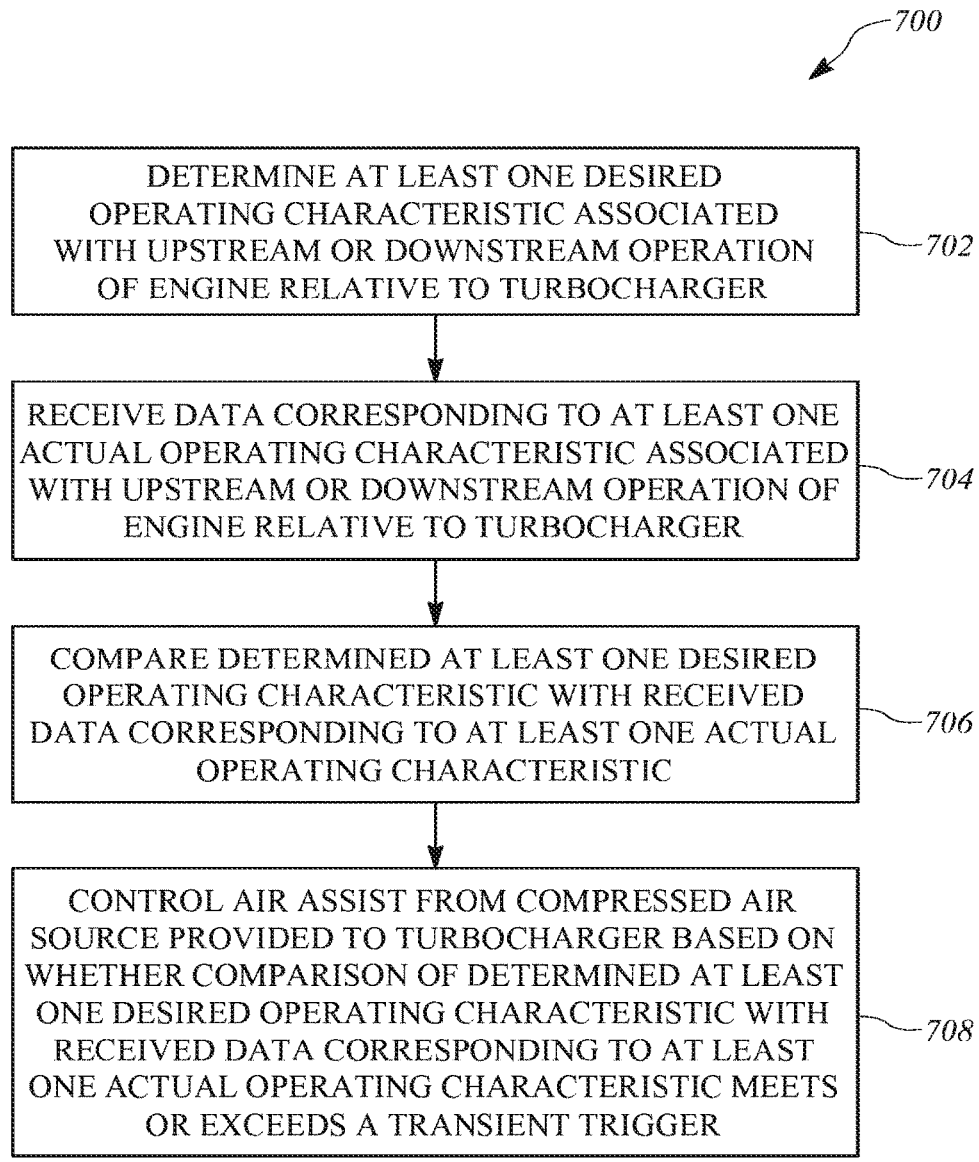
FIG. 7 is a flowchart of a method of controlling air assist provided to an engine, according to one or more embodiments of the present disclosure.

FIG. 7 illustrates a flowchart of a method 700, which may be a computer-implemented method, for controlling transient response of the engine 110 by controlling the air assist 164 from the compressed air source provided to the turbocharger 103, according to one or more embodiments of the present disclosure.

At a block 702, the method 700 can include determining at least one desired operating characteristic associated with upstream or downstream operation of the engine 110 relative to the turbocharger 103.

At a block 704, the method 700 can include receiving data corresponding to at least one actual operating characteristic associated with the upstream or downstream operation of the engine 110 relative to the turbocharger 103.

At a block 704, the method 700 can include comparing the determined at least one desired operating characteristic with the received data corresponding to at least one actual operating characteristic.

At a block 704, the method 700 can include controlling the air assist 164 from the compressed air source provided to the turbocharger 103 based on whether the comparison of the determined at least one desired operating characteristic with the received data corresponding to at least one actual operating characteristic meets or exceeds a transient trigger.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A control system to control cold transient response of an engine by controlling air assist from a compressed air source provided to a turbocharger, the control system comprising:
    a memory configured to store a transient trigger to provide compressed air from the compressed air source, via an exhaust log, to the turbocharger to boost a speed of a turbine of the turbocharger; and
    a controller in communication with the memory, the controller configured to:
        determine at least one desired operating characteristic associated with upstream or downstream operation of the engine relative to the turbocharger,
        receive data corresponding to at least one actual operating characteristic associated with the upstream or downstream operation of the engine relative to the turbocharger,
        compare the determined at least one desired operating characteristic with the received data corresponding to at least one actual operating characteristic, and
        control the air assist from the compressed air source provided to the turbocharger based on whether the comparison of the determined at least one desired operating characteristic with the received data corresponding to at least one actual operating characteristic meets or exceeds the transient trigger.

2. The control system of claim 1,
    wherein the at least one desired operating characteristic includes a desired speed of the turbine of the turbocharger, and
    wherein the at least one actual operating characteristic includes an actual speed of the turbine of the turbocharger.

3. The control system of claim 2, wherein the desired speed of the turbine is determined by the controller based on a desired intake manifold air pressure (IMAP) and a desired throttle differential pressure.

4. The control system of claim 2,
    wherein the controller controls the air assist by outputting a control signal to control an air assist valve,
    wherein the control signal triggers the air assist valve to open to increase the actual speed of the turbine, and
    wherein the control signal triggers the air assist valve to close as the actual speed of the turbine approaches the desired speed of the turbine.

5. The control system of claim 2, wherein the controller controls the air assist from the compressed air source provided to the turbocharger prior to throttle saturation.

6. The control system of claim 2, wherein the controller is configured to determine the actual speed of the turbine by taking an average of values received from one or more speed sensors configured to measure speed of the turbine.

7. The control system of claim 1,
    wherein the at least one desired operating characteristic includes a desired intake air manifold pressure (IMAP) and a desired throttle differential pressure, and
    wherein the at least one actual operating characteristic includes an actual IMAP and an actual throttle differential pressure.

8. The control system of claim 7,
    wherein the controller controls the air assist by outputting a control signal to control an air assist valve,
    wherein the control signal triggers the air assist valve to open to allow more compressed air to be provided to the turbocharger, and
    wherein the control signal triggers the air assist valve to close as a sum of the actual IMAP and the actual throttle differential pressure approaches a sum of the desired IMAP and the desired throttle differential pressure.

9. The control system of claim 1,
    wherein the at least one desired operating characteristic includes a desired intake air manifold pressure (IMAP), and
    wherein the at least one actual operating characteristic includes an actual IMAP.

10. The control system of claim 9,
    wherein the transient trigger is throttle saturation, the control of the air assist from the compressed air source includes opening an air assist valve, and
    wherein the controller opens the air assist valve to provide the air assist responsive to the throttle saturation.

11. The control system of claim 9, wherein the control of the air assist includes opening an air assist valve to provide compressed air from the compressed air source and opening a throttle valve.

12. The control system according to claim 11, wherein the air assist valve is opened prior to opening the throttle valve to control of the air assist.

13. A computer-implemented method of controlling transient response of an engine by controlling air assist from a compressed air source provided to a turbocharger, the computer-implemented method comprising:
   determining at least one desired operating characteristic associated with upstream or downstream operation of the engine relative to the turbocharger;
   receiving data corresponding to at least one actual operating characteristic associated with the upstream or downstream operation of the engine relative to the turbocharger;
   comparing the determined at least one desired operating characteristic with the received data corresponding to at least one actual operating characteristic; and
   controlling the air assist from the compressed air source provided to the turbocharger based on whether the comparison of the determined at least one desired operating characteristic with the received data corresponding to at least one actual operating characteristic meets or exceeds a transient trigger.

14. The computer-implemented method of claim 13,
   wherein the at least one desired operating characteristic includes desired speed of the turbocharger, and the at least one actual operating characteristic includes actual speed of the turbocharger, and
   wherein the controlling the air assist includes outputting a control signal to control an air assist valve, the control signal triggering the air assist valve to open to increase the actual speed of the turbocharger, and the control signal triggering the air assist valve to close as the actual speed of the turbocharger approaches the desired speed of the turbocharger.

15. The computer-implemented method of claim 13,
   wherein the at least one desired operating characteristic includes desired intake air manifold pressure (IMAP) and desired throttle differential pressure, and the at least one actual operating characteristic includes actual IMAP and actual throttle differential pressure, and
   wherein the controlling the air assist includes outputting a control signal to control an air assist valve, the control signal triggering the air assist valve to open to allow more compressed air to be provided to the turbocharger, and the control signal triggering the air assist valve to close as a sum of the actual IMAP and the actual throttle differential pressure approaches a sum of the desired IMAP and the desired throttle differential pressure.

16. The computer-implemented method of claim 13,
   wherein the at least one desired operating characteristic includes desired intake air manifold pressure (IMAP), and the at least one actual operating characteristic includes actual IMAP, and
   wherein the transient trigger is throttle saturation, the controlling the air assist from the compressed air source includes opening an air assist valve responsive to saturation of a throttle valve.

17. A method of controlling transient response of an engine by controlling air assist from a compressed air source provided to a turbocharger, the method comprising:
   determining, using a controller, at least one desired operating characteristic associated with upstream or downstream operation of the engine relative to the turbocharger;
   receiving, using the controller, data corresponding to at least one actual operating characteristic associated with the upstream or downstream operation of the engine relative to the turbocharger;
   comparing, using the controller, the determined at least one desired operating characteristic with the received data corresponding to at least one actual operating characteristic; and
   controlling, using the controller, the air assist from the compressed air source provided to the turbocharger based on whether the comparison of the determined at least one desired operating characteristic with the received data corresponding to at least one actual operating characteristic meets or exceeds a transient trigger.

18. The method of claim 17,
   wherein the at least one desired operating characteristic includes desired speed of the turbocharger, and the at least one actual operating characteristic includes actual speed of the turbocharger, and
   wherein the controlling the air assist includes outputting a control signal to control an air assist valve, the control signal triggering the air assist valve to open to increase the actual speed of the turbocharger, and the control signal triggering the air assist valve to close as the actual speed of the turbocharger approaches the desired speed of the turbocharger.

19. The method of claim 17,
   wherein the at least one desired operating characteristic includes desired manifold pressure (IMAP) and desired throttle differential pressure, and the at least one actual operating characteristic includes actual IMAP and actual throttle differential pressure, and
   wherein the controlling the air assist includes outputting a control signal to control an air assist valve, the control signal triggering the air assist valve to open to allow more compressed air to be provided to the turbocharger, and the control signal triggering the air assist valve to close as a sum of the actual IMAP and the actual throttle differential pressure approaches a sum of the desired IMAP and the desired throttle differential pressure.

20. The method of claim 17,
   wherein the at least one desired operating characteristic includes desired intake air manifold pressure (IMAP), and the at least one actual operating characteristic includes actual IMAP, and
   wherein the controlling the air assist includes opening an air assist valve to provide compressed air from the compressed air source and opening a throttle valve.

* * * * *